(12) United States Patent
Jorgensen (10) Patent No.: US 11,579,032 B2
(45) Date of Patent: *Feb. 14, 2023

(54) SYSTEMS AND METHODS FOR HIGH VOLTAGE RATING THIN FILM SENSORS

(71) Applicant: Custom Control Sensors, LLC, Chatsworth, CA (US)

(72) Inventor: Jeff Jorgensen, Woodland Hills, CA (US)

(73) Assignee: Custom Control Sensors, LLC, Chatsworth, CA (US)

( * ) Notice: Subject to any disclaimer, the term of this patent is extended or adjusted under 35 U.S.C. 154(b) by 63 days.

This patent is subject to a terminal disclaimer.

(21) Appl. No.: 17/135,606

(22) Filed: Dec. 28, 2020

(65) Prior Publication Data

US 2021/0262882 A1    Aug. 26, 2021

Related U.S. Application Data

(63) Continuation of application No. 16/806,454, filed on Mar. 2, 2020, now Pat. No. 10,876,915, which is a
(Continued)

(51) Int. Cl.
  *G01L 9/12*    (2006.01)
  *G01L 13/02*   (2006.01)
  (Continued)

(52) U.S. Cl.
  CPC .......... *G01L 9/0042* (2013.01); *G01L 9/0052* (2013.01); *G01L 19/0618* (2013.01); *G01P 5/00* (2013.01); *G01P 5/12* (2013.01)

(58) Field of Classification Search
  CPC ... G01L 19/147; G01L 9/0042; G01L 9/0054; G01L 9/0072; G01L 13/025; G01L 19/04;
  (Continued)

(56) References Cited

U.S. PATENT DOCUMENTS

| 4,024,761 A | 5/1977 | Djorup |
| 4,478,076 A | 10/1984 | Bohrer |

(Continued)

FOREIGN PATENT DOCUMENTS

| CN | 203551186   | 4/2014 |
| CN | 105393099 A | 3/2016 |

(Continued)

OTHER PUBLICATIONS

International Search Report and Written Opinion for International Application No. PCT/US2019/049533; Filed Sep. 4, 2019; in 14 pages.

(Continued)

*Primary Examiner* — Andre J Allen
(74) *Attorney, Agent, or Firm* — Knobbe, Martens, Olson & Bear, LLP (57) ABSTRACT

Improvements in thin film sensors are disclosed. These can be used for aircraft applications. Dielectric isolation washers can be provided between a pressure sensor and an exterior metal housing of a sensor assembly. In this manner, high voltage inputs from a lightning strike or other source that reach the sensor housing are not transmitted to the sensor. Dielectric washers, insulators, and potting compounds can thus isolate a metal thin film pressure sensor from adjacent metal components (e.g., using non-conducting insulating materials like Torlon, zirconia and nylon). Besides their high dielectric strength, these materials exhibit compressive strength and resistance to wear, creep and corrosion. Desirable thicknesses for these components are provided. The described thin film pressure sensor embodiments can attain a dielectric rating of 1500 VAC.

20 Claims, 3 Drawing Sheets

Related U.S. Application Data continuation of application No. 16/560,280, filed on Sep. 4, 2019, now Pat. No. 10,578,504.

(51) Int. Cl.

| | | |
|---|---|---|
| *G01L 9/00* | (2006.01) | |
| *G01L 19/06* | (2006.01) | |
| G01P 5/00 | (2006.01) | |
| G01P 5/12 | (2006.01) | |

(58) Field of Classification Search
CPC . G01L 19/0038; G01L 19/0084; G01L 19/14; G01L 9/0075; G01L 19/0069; G01L 19/0618; G01L 9/0055; G01L 9/0073; G01L 19/0092; G01L 19/0645; G01L 19/143; G01L 9/0051; G01L 9/0052; G01L 11/025; G01L 19/0007; G01L 19/0046; G01L 19/06; G01L 19/0627; G01L 19/0681; G01L 27/002; G01L 9/00; G01L 9/0041; G01L 9/0044; G01L 11/04; G01L 19/0023; G01L 19/069; G01L 19/142; G01L 19/16; G01L 7/00; G01L 7/163; G01L 7/166; G01L 9/0047; G01L 9/12; G01L 11/02; G01L 13/00; G01L 15/00; G01L 19/003; G01L 19/0609; G01L 19/0672; G01L 19/083; G01L 19/10; G01L 19/148; G01L 27/005; G01L 7/08; G01L 7/082; G01L 9/0045; G01L 9/0048; G01L 9/006; G01L 9/007; G01L 9/0076; G01L 9/04; G01L 9/045; G01L 9/06; G01L 9/065; G01L 9/125; G01L 11/00; G01L 17/00; G01L 19/00; G01L 19/0015; G01L 19/0076; G01L 19/02; G01L 19/08; G01L 19/141; G01L 19/145; G01L 19/146; G01L 1/142; G01L 1/2262; G01L 1/246; G01L 21/12; G01L 23/16; G01L 27/007; G01L 7/04; G01L 7/063; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/08; G01L 9/085; G01L 9/105; G01L 9/16; G01P 13/025; G01P 5/165; G01P 5/14; G01P 5/16; G01P 13/02; G01P 5/00; G01P 5/02; G01P 21/025; G01P 5/12; G01P 5/26; G01P 5/005; G01P 5/175; G01P 5/18; G01P 5/24; G01P 13/045; G01P 15/036; G01P 1/02; G01P 21/00; G01P 3/62; G01P 5/07; G01P 5/08; G01P 5/245
USPC ...................................... 73/170.02, 700–756
See application file for complete search history.

(56) References Cited

U.S. PATENT DOCUMENTS

| | | |
|---|---|---|
| 4,875,135 A | 10/1989 | Bishop et al. |
| 4,917,940 A | 4/1990 | Hopson |
| 5,158,801 A | 10/1992 | Hopson |
| 5,576,488 A | 11/1996 | Sheplak |
| 5,789,020 A | 8/1998 | Tran |
| 5,827,972 A | 10/1998 | Balcarek et al. |
| 5,867,886 A | 2/1999 | Ratell et al. |
| 6,209,399 B1 | 4/2001 | Probst et al. |
| 6,584,851 B2 | 7/2003 | Yamagishi et al. |
| 8,201,455 B2 | 6/2012 | Enomoto |
| 9,739,676 B2 | 8/2017 | Hio et al. |
| 2002/0062696 A1 | 5/2002 | Burczyk et al. |
| 2005/0087020 A1 | 4/2005 | Ueyanagi et al. |
| 2007/0277616 A1 | 12/2007 | Nikkei |
| 2009/0266173 A1 | 10/2009 | Kobayashi et al. |
| 2014/0339961 A1 | 11/2014 | Maejima |
| 2016/0012382 A1 | 5/2016 | Matzen |
| 2018/0128849 A1 | 5/2018 | Wong |
| 2018/0328801 A1 | 11/2018 | Shapiro |

FOREIGN PATENT DOCUMENTS

| | | |
|---|---|---|
| CN | 105841852 A | 8/2016 |
| CN | 108088610 A | 5/2018 |
| CN | 105466626 B | 1/2019 |
| DE | 19609167 A1 | 9/1997 |
| JP | 2000298071 A | 10/2000 |
| JP | 2006145316 A | 6/2006 |
| JP | 2007057417 A | 3/2007 |
| JP | 2007139799 A | 6/2007 |
| WO | WO 2013110045 A1 | 7/2013 |

OTHER PUBLICATIONS

United Electric Controls (UE Transducer); Precision Sensors Division; Pressure Transducers for Aircraft; BHA2K0710 TRA-1; in 4 pages.

Valcom; Structural schematics for Semi-conducting pressure sensors Structural schematics for Semiconducting pressure sensors; https://www.valcom.co.jp/english/product/pse/principle/index.html; 2pages.

SYSTEMS AND METHODS FOR HIGH VOLTAGE RATING THIN FILM SENSORS

CROSS-REFERENCE TO RELATED APPLICATIONS

This application is a continuation of U.S. patent application Ser. No. 16/806,454, titled "SYSTEMS AND METHODS FOR HIGH VOLTAGE RATING THIN FILM SENSORS" filed Mar. 2, 2020 and issuing as U.S. Pat. No. 10,876,915, which is a continuation of U.S. patent application Ser. No. 16/560,280, titled "SYSTEMS AND METHODS FOR HIGH VOLTAGE RATING THIN FILM SENSORS" filed Sep. 4, 2019 and issued as U.S. Pat. No. 10,578,504. Any and all applications for which a foreign or domestic priority claim is identified in the Application Data Sheet of the present application are hereby incorporated by reference under 37 CFR 1.57. The entire disclosure of each of the above-identified applications is incorporated by reference herein and made part of this specification, for all purposes, for all that each contains.

FIELD

The present disclosure relates to systems and methods for thin film pressure, temperature and flow sensors used in various aircraft and industrial systems.

BACKGROUND

Aircraft systems and pressure sensors installed on them can be subjected to high voltage inputs from lightning strikes that can damage unprotected sensors. Since sensor housings are typically metal (stainless steel) and installed on other metal assemblies (such as a pump or manifold), the entire system may be conductive and susceptible to these high voltage inputs. Therefore, the sensors need to protected and isolated or electrically insulated from adjacent metal components. Typical thin film pressure sensors are rated to withstand 500 VAC of power.

However many aircraft systems require sensors to survive 1500 VAC of power spikes. Moreover, aircraft pressure sensors are routinely subjected to harsh environmental conditions. Since these sensors often measure hydraulic pressure, the sensors can be exposed to the caustic nature of some hydraulic oils. Also, pressures often reach 4500 psi and temperatures can range between −55° C. to 200° C., causing sensor components to be subjected to substantial compressive forces, wear, creep and distortion. The sensors may also be subject to impulse pressure cycling, which can result in sensor failure due to fatigue.

Two types of pressure sensors are appropriate for use on aircraft: MEMS (micro-electromechanical) and Thin Film sensors. Both types use piezoresistive strain gauges to convert pressure into an electrical output. The most common is a MEMS sensor. The strain gauge for this sensor is molecularly bonded on to a silicone substrate and is rated to 1500 VAC. In this case, the silicone acts as an insulating material for the strain gauge. However, due to its construction, this type of sensor is more expensive than a thin film sensor and cannot come in contact with harsh system medias being measured, like fuel or hydraulic oils. Therefore, it is housed in a sealed metal pressure capsule filled with silicone oil and covered by a thin stainless diaphragm. In this case, the media pressure is applied to the stainless diaphragm and transferred by the silicone oil to the MEMS sensor. A second type of sensor is a metal thin film sensor. This sensor has a metal housing and metal diaphragm on which the strain gauge sensor is directly deposited. One of the main benefits of this construction is that the measured media can be applied directly to the diaphragm under the strain gauge. However, due to its metal housing and diaphragm, this type of sensor will not withstand 1500 VAC and has a lower dielectric rating of approximately 500 VAC.

A metal thin film sensor uses changes in resistance in a Wheatstone bridge strain gauge structure, due to the metal diaphragm deflection, to measure pressure. As noted, the base 14 of the sensor body is made of stainless steel. The resistance structure is produced by photolithography. Thin film measuring cells stand out due to their excellent resistance to pressure peaks and bursting pressure. Extremely high pressures can be measured—even when exposed to high shock and vibration loads. In metal thin film technology, four resistors are interconnected to create the Wheatstone bridge.

SUMMARY

To solve the problems associated with previous thin film pressure sensors, in certain embodiments, dielectric isolation washers are provided between the pressure sensor that senses the system pressure and the interior surfaces of the exterior metal housing and other pressure fittings of the system. That way, high voltage inputs from a lightning strike that reach the sensor housing are not transmitted to the sensor. In some embodiments, the dielectric washers isolate the metal thin film pressure sensor from all adjacent metal components in the assembly with non-conducting insulating materials like Torlon, Zirconia and Nylon. Torlon is a registered trademark of the Solvay company, and is an aerospace grade material that has excellent insulative and durability features. It can be used as an electrical insulator due to its high dielectric strength. It has excellent compressive strength and outstanding resistance to wear, creep and chemicals. In order to attain a dielectric rating of 1500 VAC, the thickness of these isolation washers and insulators is increased. In the embodiments described below, appropriate thicknesses are set forth.

Furthermore, the thin film pressure sensors of some described embodiments are mounted within the housing of the system, using the insulators, in a manner which allows them to "float" within the housing, meaning there are no metal-to-metal connections of the sensor assembly in their mounting. Moreover, the sensors of the present embodiments are much less expensive and have several technical advantages over MEMS pressure sensors. The present thin film sensors have an operating temperature range from −55° C. to 200° C., versus a MEMS pressure sensor range of −40° C. to 125° C. The present thin film sensors are also less complex (have fewer parts) than MEMS sensors, are easier to work with, and are more stable at extreme temperatures. In addition, the sensors are durable and rugged, given their steel housing. On the other hand, notwithstanding their conductive metal housing, achieving a dielectric rating of 1500 VAC overcomes a significant disadvantage of prior thin film sensors and provides an important advantage over MEMS sensors in aircraft applications.

DETAILED DESCRIPTION

For purposes of the present description, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein. The advantages of the present embodiments can be carried out with respect to other sensors, such as temperature and flow sensors, in addition to pressure sensors.

Systems, methods, and processes, which represent various embodiments, will now be described with reference to the drawings. Variations to the systems, methods, and processes which represent other embodiments will also be described. Thus, the present invention is not limited by the type of environment or application in which the systems, methods, and processes are described herein, meaning that they may be successfully utilized in connection with industries other than the aircraft industry.

Figure 1:
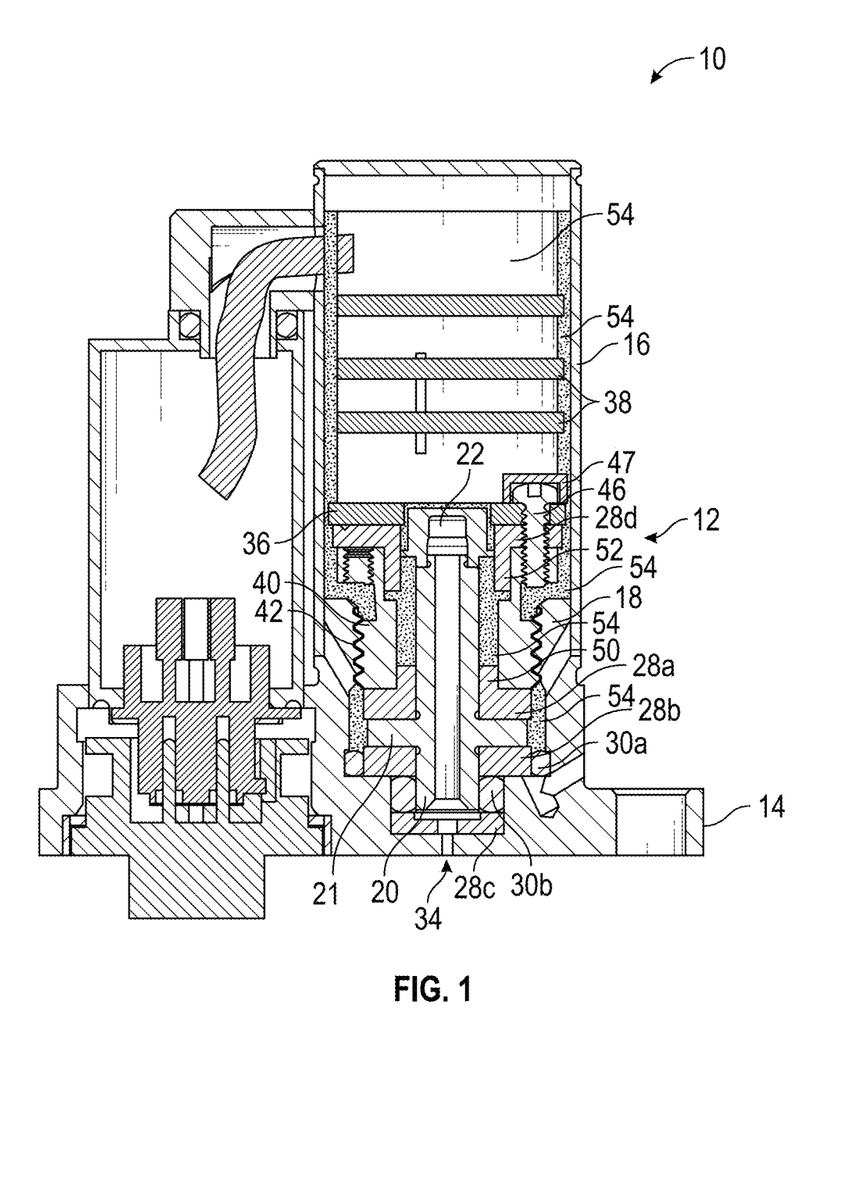
FIG. 1 is a side cross-sectional view of one embodiment of the present thin film pressure sensor assembly.
Figure 2:
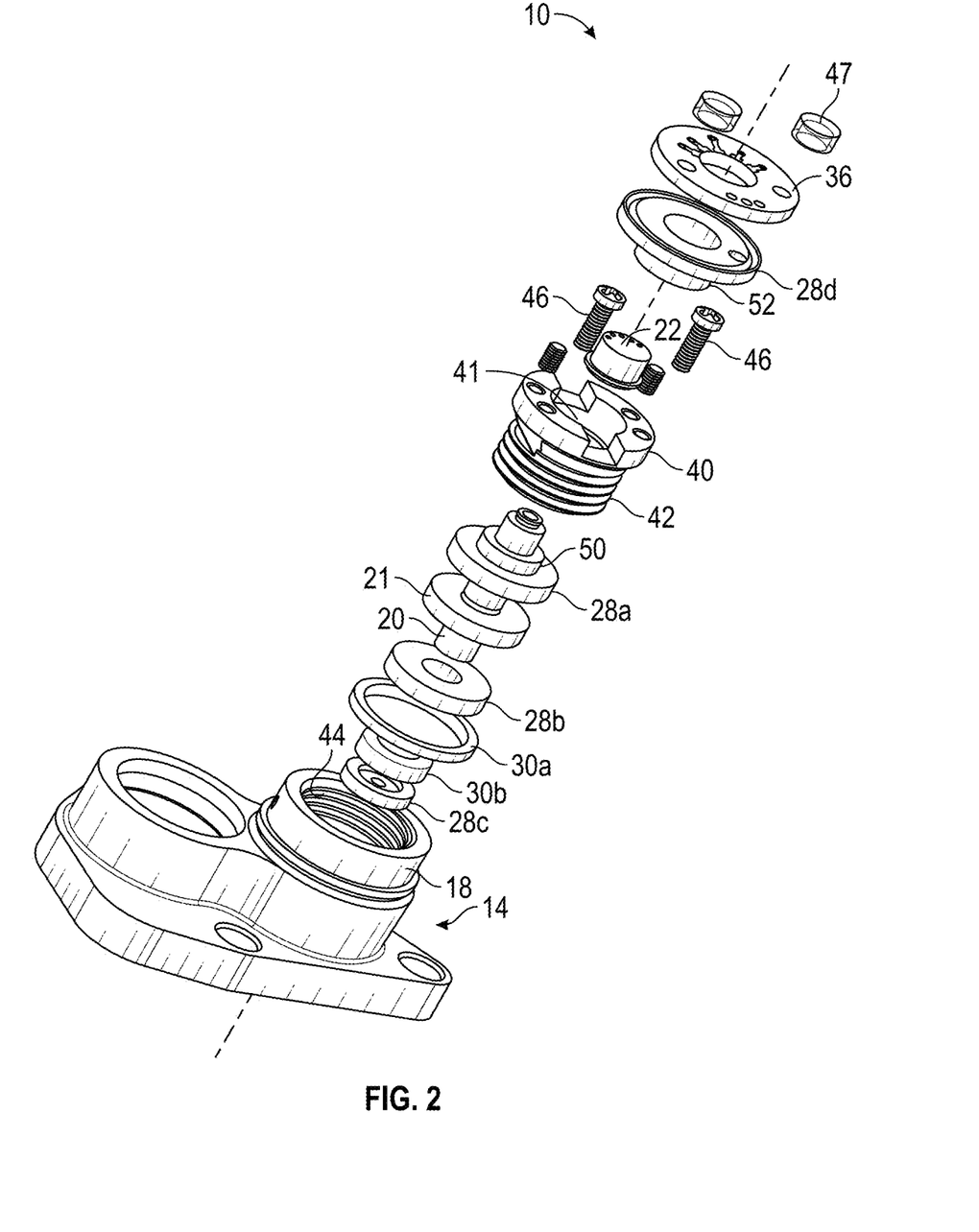
FIG. 2 is an exploded view of the thin film pressure sensor assembly of FIG. 1 illustrating most of its individual components.

With reference to FIGS. 1 and 2, the features for at least one embodiment will be described. The thin film pressure sensor assembly 10 comprises a stainless steel body or housing 12 which is situated on the right hand side of FIG. 1. The left hand side illustrates other components less relevant to this disclosure. The stainless steel body or housing contains various components which contribute to the pressure measurement, containment and/or which insulate the structural components so as to withstand high voltage spikes.

The housing 12 has two segments—a lower base 14 and an upper cover 16. The base 14 is shown best in FIG. 2 and the cover 16 is seen best in FIG. 1 and not shown in FIG. 2 because of the exploded nature of that figure. The lower base 14 supports the sensor assembly 10, including internally threaded assembly platform 18, and the upper cover 16 seals, surrounds and protects the sensor assembly 10 from the external environment. Situated within the threaded assembly platform 18 is the stainless steel sensor pedestal 20, including the sensor itself 22, situated atop the pedestal 20. At the bottom of the lower base 14 is located a pressure port 34 where the fluid or pneumatic pressure enters the sensor assembly 10 from the aircraft system and is applied through the sensor pedestal 20 to the thin film sensor 22. As depicted in FIGS. 1 and 2, the thin film sensor 22 and pressure port pedestal 20 assembly are isolated from all adjacent metal components by non-conductive Torlon, zirconia or nylon insulators 28, rubber or silicone O-rings 30, and/or a potting compound 54. By identifying a minimum thickness for these materials surrounding the thin film sensor 22 and the pressure port pedestal assembly 20 present sensor assembly 10 embodiments are able to achieve a dielectric rating of 1500 VAC. As noted above, various combinations and thicknesses of these dielectric materials are within the scope of this application. As explained in more detail below, the insulators, which may comprise insulator washers, comprise upper and lower insulator washers 28a and 28b, as well as pressure port insulator or insert 28c. A fourth insulator washer 28d is described below in conjunction with the sensor 22 and a register 40. Two O-ring seals 30a and 30b are shown in FIGS. 1 and 2.

As shown in FIG. 1, the pressure port 34 receives the fluid which is the subject of the pressure measurement. The port 34 opens into a cylindrical stainless pressure port pedestal 20 at the top of which is laser welded the thin film pressure sensor 22. The pressure port 34 and pedestal 20 are shown particularly well in the cross-sectional view of FIG. 1. The pedestal 20 includes a disc-shaped skirt 21 or waist, which exhibits a cylindrical shape, for mounting the pedestal 20 within the sensor body or housing 12. The top of the thin film sensor 22 contains the Wheatstone bridge strain gauge which is wire bonded and coupled to the circuit board 36 above the sensor 22, as illustrated in FIGS. 1 and 2. The housing cover 16 also covers or encloses other components including various other circuit boards 38 as shown.

The thin film pressure sensor assembly 10 is mounted and contained within the housing 12 by a sensor assembly register 40 best illustrated in FIG. 2. Sensor assembly register 40 is also cylindrical in shape and exhibits external threads 42 which mate with the internal threading 44 of the platform 18 of the housing base 14 to register and mount the pressure port pedestal 20 within the housing 12. Two bolts 46 are utilized to mount the circuit board 36 to the top of the sensor assembly register 40 and lock the register 40 in place as illustrated. Torlon caps 47 are used to cover the heads of the bolts 46. These two bolts (only one of which is shown in FIG. 1) or screws 46 are used to mount and retain the circuit board 36 to the top of the sensor assembly register 40. This is important because the thin film sensor is wire bonded with small 0.001 in diameter wires to this circuit board and cannot move once assembled. This connection allows the electrical output from the thin film sensor to be transferred to circuit board 36 and then sequentially to the upper circuit boards 38.

These are the typical components of a thin film pressure sensor included within a stainless steel housing. However, in this embodiment, multiple insulators, washers, and or O-ring seals are added and utilized to provide a high voltage rating for the sensor. It will be understood that insulators and other dielectric components of different quantities and shapes may be utilized and are within the scope of the present disclosure and that the embodiment illustrated and described is only one possible embodiment of the present invention.

Referring again to FIGS. 1 and 2, near the pressure port area 34, a nylon insert insulator 28c is positioned between the base 14 and the pedestal 20. This insulator 28c can be made of nylon or similar dielectric material. At least two O-ring ring seals 30a and 30b are situated just above the nylon insert insulator 28c, one of which 30b surrounds the base of the pedestal and the second 30a surrounds a lower insulator washer 28b. Lower insulator washer 28b is also preferably manufactured from a high dielectric, corrosive resistant material. Two such materials are nylon or zirconia; however, in this embodiment the lower insulator washer is made from Torlon. As illustrated in these FIGS. 1 and 2, in addition to the lower insulator washer 28b surrounding the pedestal 20, an upper Torlon insulator washer 28a is also utilized. These washers sandwich the skirt 21 between them and provide at least in part the desired electrical insulation and isolation as described above.

Upper insulator washer 28a also includes an upper shoulder 50 portion which mates within the assembly register 40 as best illustrated in FIG. 1. A fourth insulator washer 28d is situated within the housing 12 near the pressure sensor 22 itself. This fourth insulator washer 28d is best illustrated in FIG. 2. It also includes a lower shoulder 52 which mates within an upper recess in the assembly register 40 and, advantageously, surrounds the pressure sensor 22 itself. These four insulator washers 28a-28d provide important electrical insulation of the thin film pressure sensor 22. As noted above, other washer shapes and quantities are within the scope of the present invention. Advantageously, this fourth insulator washer 28d also insulates the bolts 46 which mount the circuit board 36 to the pressure sensor assembly.

One of the advantages of the present embodiment is the use of Torlon insulator washers. Various types and sizes of such insulator washers may be utilized. Such washers may be manufactured from an extrusion or injection molding process, or a compression molding process using a polymer formulation. One such formulation is a polyimide. Such washers offer excellent compressive strength, electrical insulation, and impact strength. This material exhibits the ability to carry loads over a broad temperature range and is resistive to abrasive wear and corrosion.

With reference to FIG. 1, another advantage of the present embodiment is the use of a potting material 54 which also exhibits important insulation qualities. The potting material 54 is placed within the assembly housing 12 and generally is situated between the sensor assembly components and the interior wall of the cover 16. This material serves to hold the components of the sensor assembly in place while also providing an insulation advantage. Thus, one preferred type of potting material is Epoxylite 813-9. Epoxylite is a trademark of the Epoxylite Corporation.

Several types of potting compound may be used in the present embodiments. One preferred compound is an ultra-high temperature potting resin that is manufactured from a two-part epoxy system. The preferred potting compound packed around the sensor and pedestal is Epoxylite #813-9. This is a specific potting compound which incorporates a high temperature potting resin with high chemical resistance and good dielectric resistance. Potting material 54 is also placed in the upper portion of the housing 12 within the cover 16 to hold various circuit boards 38 in place.

Thus, with reference to FIG. 1, it will be noted that the circumferential dimension of various components does not extend completely to the interior surface of the housing 12 or cover 16. This includes the upper and lower insulator washers 28a, 28b as well as the third and fourth insulator washers 28c, 28d. Therefore, space is provided for the potting material 54 to hold these components in place and to insulate them from the stainless steel material of the base 14 and the cover 16. Moreover, potting material 54 also is situated between the pedestal skirt 21 and the housing cover 16. The pedestal skirt 21 serves as an enlarged flange formed on the pedestal 20 in order to allow washers 28a, 28b to insulate the pedestal 20 and secure it within the housing 12.

Advantages and Methods

The advantages described above are achieved, at least in part, by a system and method of mounting the sensor assembly within the housing using insulative components (such as the various insulative components mentioned). It should be noted that variations in the number and placement of such components are possible and within the scope of the present application. Furthermore, the insulative components are situated with respect to the pedestal/sensor assembly 20, 22, and with respect to the pressure register 40, in order to achieve the insulative, floating mounting of the pedestal/sensor assembly. These components, together with the design of the pedestal and register, provide a mounting which is in the nature of a friction fit or friction mount within the housing, as shown in the figures and described herein. Thus, even without a fixed weld to the base or other metallic members, the pedestal/sensor assembly is retained securely within the housing.

Certain embodiments described herein enjoy various advantages with respect to the manner in which the thin film sensor is mounted. As noted above, the sensor is welded to the top of an elongated pressure port pedestal. However, unlike previous designs, the pressure port pedestal incorporates a "floating" mounting design in which, other than this single weld, there is no other fixed mounting of the sensor or the pedestal with respect to the housing. Of course, the pressure port pedestal/sensor assembly is not literally "floating" in the lighter-than-air sense, but rather it floats, in the dielectric sense, within the housing in that it (along with its pedestal 21) is not rigidly or fixedly mounted to any other rigid component, as in previous designs. Furthermore, other than the weld to the top of the pedestal, there are no metal-to-metal connections.

In previous designs, the sensor was welded directly to the top of a short 0.090-0.095 inch pedestal which was integrated into or part of a threaded bottom pressure fitting. This pressure fitting was then installed (e.g. threaded) directly into the corresponding pressurized aircraft system (e.g. hydraulic manifold, filter, pump, actuator, etc.) that was to be monitored by the sensor. In other words, previous designs did not have the floating pedestal mounting or the sensor assembly register as exhibited in the current embodiments. As a result, in these designs, the sensor was mounted only by metal-to-metal interconnections between the pedestal, the bottom pressure fitting, and the aircraft system base, which resulted in electrical conduction between all of these components. Therefore, there was no insulative mounting and the sensor could only be rated at 500 VAC.

In various embodiments of the current design, the pressure port pedestal floats within the housing and is mounted therein by virtue of the dielectrics which surround it. These various insulated members cause the pedestal to be packed tightly within the sensor assembly register. Thus, the pressure port pedestal and sensor assembly is mounted within the register without any interconnections which are electrically conductive.

Because of the high pressures (e.g. 4500 psi) to which certain embodiments are subject, and because there is no fixed mounting of the pressure port pedestal/sensor assembly, it is advantageously retained and packaged securely within the sensor housing. This cannot be accomplished by the dielectric elements alone, at least in certain embodiments. Therefore, in various embodiments, the sensor assembly register plays an important role in registering and retaining (e.g. at least by exerting a compression force on the components) the pedestal/sensor assembly within the housing and, in particular, within the base. Thus, as shown in FIG. 2, the sensor assembly register 40 is provided with a plurality of external threads (at least 3 threads) which are received by the internal threading of the base 14. By this mounting technique, the pedestal/sensor assembly and the various insulative elements (i.e. dielectric members) "float" within the housing. Furthermore, the register 40 exhibits an open upper cylindrical section which allows the sensor some room for movement due to further compression of these elements, when the pedestal is subjected to high pressures.

Due to the elongated design of the pedestal, it has sufficient length to receive various dielectric and insulative elements. These elements surround the pedestal/sensor assembly and allow it to be packaged securely within register and outer housing. This elongation also provides the height necessary for the sensor assembly register 40 to be able to be placed over the sensor assembly and secure these elements to the base 14 of the housing with a threaded connection, as explained above. That is, the sensor assembly register serves to provide a compression force to the various elements discussed above. The elasticity of the dielectric components, as well as the washers and O-rings seals, allow them to be compressed into the floating mounting described above.

The bottom of the base 14 is provided with a small hole which comprises the pressure port. The pressure port pedestal is situated directly above the pressure port and has a hollow interior portion which communicates the observed pressure to the thin-film sensor mounted atop the pedestal.

Figure 3:
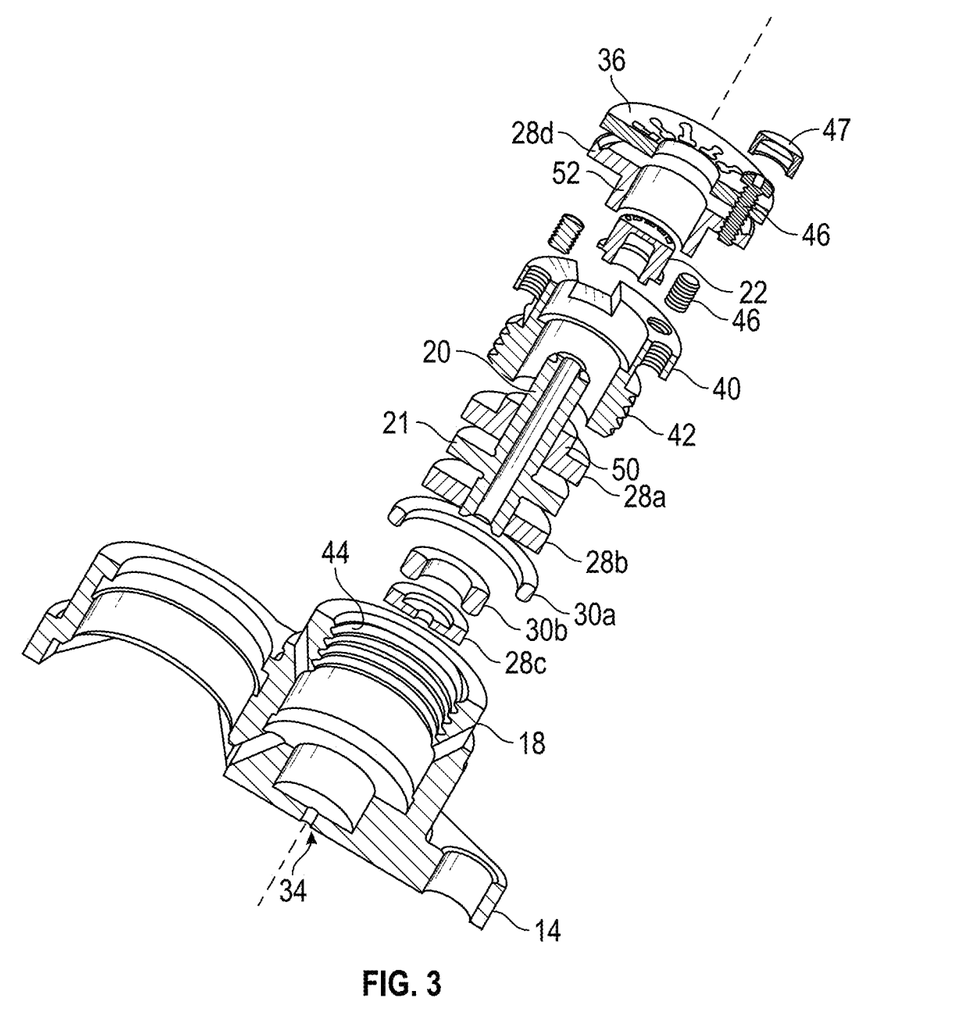
FIG. 3 is an exploded view of the sensor assembly similar to FIG. 2 but in cross section, thus illustrating the dimensional advantages of certain components.

With reference to FIG. 3, it will be noted that various components have thicknesses which are sufficient to provide the dielectric advantages of this embodiment. Thus, nylon insulator spacer or insert 28c has a thickness of about 0.062 in. The O-ring seals 30a, 30b are preferably of the 2-14 and 2-105 type, respectively. The lower insulator washer 28b has a thickness of about 0.090 inches. The diameter of these components is sized depending upon the diameter of the housing and can be adjusted. Accordingly, in these embodiments, as noted above, the diameter is slightly undersized to provide for the use of the dielectric potting material 54 described above and illustrated in FIG. 1. The gap between the circumference of these dielectric washers and the interior surface of the housing or cover is about 0.070 inches, to allow insertion of the potting material. In addition, the upper insulator washer 28a has a base thickness of about 0.090 in. and the shoulder 50 has a thickness of about 0.073 in. The fourth insulator washer 28d has a thickness of approximately 0.70 inches.

In conclusion, the thin film sensor of the present embodiments provide important advantages over prior thin film sensors and MEMS sensors.

Embodiments

Disclosed embodiments include a system for a high voltage rating thin film sensor assembly. The system can comprise a housing containing the thin film sensor assembly. The housing can comprise a base and a cover. The housing can also have an elongated pedestal with the thin film sensor mounted thereon to form the thin film sensor assembly. The pedestal can have a flange formed on the circumference of the pedestal. At least two dielectric components can surround the pedestal and sandwich the flange. The dielectric components can be configured to electrically insulate the assembly within the housing without metal-to-metal interconnections. Based on these features (and potentially others), the assembly can withstand voltage peaks between about 500 VAC and 1500 VAC. A register can be fixedly mounted to the base and within the housing. The register and the base can contain, at least in part, the dielectric components within a hollow portion of the register and the base. The register can exert a compression force on the dielectric components, thereby mounting the assembly within the housing.

In the above system, the thin film sensor assembly can comprises a thin film pressure sensor. The base can comprises a pressure port and the pedestal can comprise a hollow interior conduit configured to communicate a pressure to the thin film pressure sensor. The register can align the pedestal conduit with the pressure port opening. At least two additional dielectric components can be situated within the register or the base for mounting the assembly within the housing. The dielectric components can comprise insulators made from a polyimide material. The insulators can comprise nylon washers. The register can have a lower portion configured for threaded engagement with the base to form a composite pressure fitting. The pressure fitting can be configured to withstand pressures of up to about 4500 psi.

Described embodiments also include a method for assembling a high voltage rating sensor package. The method can comprise providing a housing configured to contain a thin film sensor assembly. The housing can have a base, a cover, and an elongated pedestal having the thin film sensor mounted thereon to form a thin film sensor assembly. The method can include inserting the thin film sensor assembly within the housing and mounting the thin film sensor assembly within the housing using at least two dielectric components surrounding the elongated pedestal. The dielectric components can be configured to electrically insulate the assembly within the housing without metal-to-metal interconnections. Thus, the assembly can be electrically floating within the housing and can withstand voltage peaks between about 500 VAC and 1500 VAC. The method can also include registering the assembly to the base and within the housing, and applying a compressive force to the dielectric components. This can allow the assembly to electrically float within the housing while being fixedly mounted therein.

The above method can further comprise sandwiching at least two dielectric components around a flange formed on the pedestal. It can also include inserting a third dielectric component within the housing to surround the thin film sensor. A pressure port can be formed in the base and the method can include registering the pedestal in the base so as to be adjacent the pressure port. The method can further comprise inserting a fourth dielectric component in the base adjacent the pedestal and the pressure port. The method can include registering the thin film sensor assembly to the base using a threaded engagement between a sensor assembly register and the base. The compressive force can be applied by the threaded engagement. The method can further comprise securing a circuit board to the thin film sensor assembly.

Described embodiments include an isolation and alignment apparatus for a thin film pressure sensor. The apparatus can comprise a base. The base can have a securement feature configured to connect to a pressurized system. The base can also have an opening for access to a measurement portal in the pressurized system, the opening configured to allow fluid communication between the interior of the pressurized system and an interior portion of the apparatus. The apparatus can also have: a mount; a strong rigid cover configured to connect to the base and surround the interior portion of the apparatus; and an elongate pedestal, sized to fit inside the cover. The elongate pedestal can have: a tip configured to provide a mounting support for a thin film pressure sensor; an elongate open interior passage terminating at the tip for fluid communication between the measurement portal and the thin film pressure sensor; and a feature that protrudes laterally from the elongate axis of the pedestal. The apparatus can also have multiple isolation bodies configured to surround and electrically isolate the elongate pedestal from the base and the cover; and an interior securement device configured for installation within the cover. This installation can: avoid physical contact with the sensor or the pedestal; secure the pedestal in place by holding the multiple isolation bodies tightly against the laterally protruding feature of the pedestal; and maintain the pedestal's position with respect to the opening and within the cover.

The apparatus described above can also include the following features. The base, cover, pedestal, and internal securement device can all be metal. The isolation bodies can all be dielectric. The pedestal's elongate open interior passage can be sized to improve accuracy of pressure readings without adjacent turbulent fluid flow. The internal securement device can include an open space surrounding the sensor and use a threaded connection with the base to secure the pedestal in place, hold the multiple isolation bodies tightly, and maintain the pedestal's position. The apparatus can additionally comprising a filler dielectric material that substantially fills remaining space within the cover not occupied by the pedestal, internal securement device, isolation bodies, and any supporting structures. In the apparatus, the cover can be attached to the base with a threaded connection that is separate from the threaded connection of the internal securement device. Moreover, the length of the pedestal, dimensions of the isolation bodies, thickness of the filler dielectric material, dimensions of the cover, space around the sensor, and dielectric properties of all non-metal features can be selected and configured to allow the sensor to continue working when the base and cover are subjected to up to 1500 Volts.

Terminology and Conclusion

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics may be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

A number of applications, publications, and external documents may be incorporated by reference herein. Any conflict or contradiction between a statement in the body text of this specification and a statement in any of the incorporated documents is to be resolved in favor of the statement in the body text.

Although described in the illustrative context of certain preferred embodiments and examples, it will be understood by those skilled in the art that the disclosure extends beyond the specifically described embodiments to other alternative embodiments and/or uses and obvious modifications and equivalents. Thus, it is intended that the scope of the claims which follow should not be limited by the particular embodiments described above.

What is claimed is:

1. A system for a high voltage rating thin film sensor assembly, comprising:
    an elongate pedestal having a pedestal length and a thin film sensor mounted thereon at an interior end thereof, the pedestal having a flange formed thereon that extends transverse to the pedestal length and has a total width in the transverse dimension that is less than the pedestal length;
    an elongate open interior passage within the elongate pedestal, the passage sized to reduce fluid turbulence toward the pedestal's interior end nearest the thin film sensor; and
    at least two dielectric components surrounding the pedestal and sandwiching the flange, the dielectric components configured to electrically insulate the pedestal and sensor.

2. The system of claim 1, wherein the thin film sensor comprises a thin film pressure sensor.

3. The system of claim 1, further comprising a housing base comprising a pressure port comprising an opening alignable with the elongate open interior passage of the pedestal to communicate a pressure to the thin film sensor.

4. The system of claim 3, further comprising a register fixedly mounted to the housing base and configured to align the elongate open interior passage of the pedestal with the pressure port opening.

5. The system of claim 4 wherein at least two dielectric components are situated within the register or the housing base for mounting the assembly within the housing, the components configured for positioning around the pedestal and the flange.

6. The system of claim 1 wherein the at least two dielectric components comprise a polyamide or polyimide material.

7. The system of claim 1 wherein the at least two dielectric components comprise nylon washers.

8. The system of claim 4 wherein the register comprises a portion configured for threaded engagement with the base to form a composite pressure fitting, whereby the pressure fitting is configured to withstand pressures of up to about 4500 psi.

9. A method for assembling a high voltage rating sensor package, comprising:
    providing a pedestal having a length and a thin film sensor mounted thereon at an interior end thereof to form a thin film sensor assembly, the pedestal further comprising a flange that extends transverse to, but by a distance less than, the pedestal length; and
    mounting the thin film sensor assembly using at least two dielectric components adjacent the pedestal and in pressure contact with the pedestal or flange, the dielectric components configured to electrically insulate the assembly and flange from metal-to-metal interconnections.

10. The method of claim 9, further comprising sandwiching the at least two dielectric components around the flange.

11. The method of claim 9, further comprising inserting another dielectric component to surround the thin film sensor.

12. The method of claim 9, further comprising:
providing a housing base including a pressure port; and
inserting the thin film sensor assembly into the housing base
registering the pedestal in the housing base such that the port allows fluid access to the thin film sensor through the pressure port.

13. The method of claim 12, further comprising inserting another dielectric component in the housing base adjacent to the pedestal and the pressure port.

14. The method of claim 12, wherein registering pedestal in the housing base uses a threaded engagement between a sensor assembly register and the housing base.

15. The method of claim 14, wherein compressive force is applied by the threaded engagement.

16. The method of claim 15, further comprising securing a circuit board to the thin film sensor assembly.

17. An isolation and alignment apparatus for a thin film pressure sensor, the apparatus comprising:
a base having:
a securement feature configured to connect to a pressurized system;
an opening for access to a measurement portal in the pressurized system, the opening configured to allow fluid communication between the interior of the pressurized system and an interior portion of the apparatus;
a pedestal having:
a length extending from the opening to an interior pedestal end;
a tip at the interior pedestal end and configured to provide a mounting support for the thin film pressure sensor;
an elongate open interior passage terminating at the tip, the passage configured to permit fluid communication between the measurement portal and the interior pedestal end; and
a feature that protrudes laterally from the elongate axis of the pedestal by an amount less than the pedestal length; and
multiple isolation bodies configured to surround and electrically isolate the elongate pedestal and sensor from the base.

18. The apparatus of claim 17, wherein:
the base and pedestal are metal;
the isolation bodies are dielectric; and
the pedestal's elongate open interior passage is sized to improve accuracy of pressure readings without turbulent fluid flow adjacent the sensor.

19. The apparatus of claim 18, further comprising a cover and an interior securement device configured for installation within the cover and interaction with the securement feature such that the interior securement feature:
avoids physical contact with the sensor or the pedestal;
secures the pedestal in place by holding at least one of the multiple isolation bodies tightly against the laterally protruding feature of the pedestal; and
maintains the pedestal's position with respect to the opening.

20. The apparatus of claim 19, wherein the length of the pedestal, dimensions of the isolation bodies, space around the sensor, and dielectric properties of all non-metal features are configured to allow the sensor to continue working when the apparatus is subject to voltage peaks of between approximately 500 and 1500 Volts AC.

* * * * *